United States Patent

[11] 3,601,304

[72] Inventor Momtaz Nosshi Mansour
Duarte, Calif.
[21] Appl. No. 746,229
[22] Filed July 19, 1968
[45] Patented Aug. 24, 1971
[73] Assignee Unitek Corporation
Monrovia, Calif.

[54] WIRE BONDER
11 Claims, 4 Drawing Figs.

[52] U.S. Cl. .......... 228/1,
29/470.3, 29/626, 156/73, 310/8.2
[51] Int. Cl. .......... B23k 1/06,
B23k 5/20
[50] Field of Search .......... 228/1;
156/73; 310/8.2; 29/626, 470.3

[56] References Cited
UNITED STATES PATENTS
3,444,612 5/1969 Pennings .......... 228/1 X
3,342,395 9/1967 Diepeveen .......... 228/1
3,305,157 2/1967 Pennings .......... 228/1

*Primary Examiner*—Charlie T. Moon
*Assistant Examiner*—R. J. Craig
*Attorney*—Christie, Parker & Hale ABSTRACT: A wire bonder having a housing, a manipular workpiece-mounting post secured to the housing and a bonding tip reciprocally movable relative to the mounting post. The bonding tip is secured in a holder connected to an ultrasonic transducer and the assembly is in turn operatively engaged with a drive mechanism for reciprocating the bonding tip which includes a first linkage which is secured to a first leaf spring flexibly attached to the housing. Flexibly attached to the first linkage by a second leaf spring is another linkage, one end of which movably engages a planar surface of the housing and another end of which mounts the transducer and tip assembly.

INVENTOR.
MOMTAZ NOSSHI MANSOUR

BY

Christie, Parker & Hale
ATTORNEYS

INVENTOR.
MOMTAZ NOSSHI MANSOUR
BY Christie, Parker & Hale
ATTORNEYS.

WIRE BONDER

BACKGROUND OF THE INVENTION

1. Field of the invention

This invention relates to wire bonders and more particularly to ultrasonic wire bonders having a drive mechanism which includes linkages secured to each other and to a housing by means of flexible leaf springs.

State of the Prior Art

Recently, wire-bonding apparatus employing ultrasonic vibrations of a bonding tip have become widely used in conjunction with the assembly of semiconductor devices. Examples of such ultrasonic wire bonders are described in U.S. Pat. Nos. 3,305,157 and 3,342,395.

The small size of semiconductor devices presents formidable problems that must be overcome when constructing an apparatus for use in assembling the devices. Wire that must be bonded to terminals of the device and specific portions of a semiconductor chip located on the device are as small as 1 mm. in diameter. To insure reliable assembly and production of the semiconductor devices, the bonding apparatus must be consistently accurate and positive in operation. The slightest variation in the positioning of the wires may lead to its malfunctioning. Inaccurate or sluggish performance of the bonding apparatus may prevent satisfactory bonding of the wire.

Generally, a semiconductor device to which lead wires are welded by an ultrasonic wire bonder is positioned on a mounting post adjacent an ultrasonic bonding tip. The tip is moved toward the semiconductor device until it contacts a terminal or the semiconductor chip and the lead to be welded thereto. After contact is established, ultrasonic mechanical vibrations are imparted to the tip and wire until the wire is securely bonded to the chip or the terminal. The motion and positioning of the bonding tip must be virtually the same during each repetition. Any movements of the tip in a direction other than toward and away from the semiconductor device quickly become fatal to the accurate positioning of the tip and the leads to be welded to the device.

Presently, the movement is imparted to the weld tip by a linkage arrangement which is actuated by a rotating cam and moves the tip substantially linearly toward and away from the semiconductor device. The various members of the linkage are pivotable relative to each other about a plurality of shafts. To obtain greater accuracy, precision ball bearings are disposed at pivot points of the members. Proper functioning of the bonding apparatus requires the linkage members as well as the shafts and ball bearings to be constructed with the highest degree of accuracy. This substantially raises the cost of constructing the wire bonder. In spite of the most careful construction of all component parts, a certain amount of inconsistent motion, i.e., movements of the linkages members relative to each other in a nondesirable fashion due primarily to inaccuracies in the construction and positioning of the ball bearings, cannot be avoided.

This inconsistent motion, i.e., backlash and sluggishness, causes the tip to move in directions which deviate from the desired path of motion toward and away from the semiconductor device mounted on the mounting post. Dislocations in the positioning of the bonding tip and therefore of the leads being bonded by the tip to the device often result in bad bonds which require rejection or repair. Either alternative is costly and contributes to the overall cost of semiconductor devices constructed with the help of ultrasonic wire bonders heretofore available.

SUMMARY OF THE INVENTION

The present invention provides an ultrasonic wire bonder wherein inconsistent motion in the drive mechanism for a tip is minimized. Briefly, it comprises support means including means for mounting a semiconductor device to be assembled at a work location and an ultrasonic transducer connected with the bonding tip and mounted on a suitable holder. Drive means for intermittently moving the holder and bonding tip toward and away from the work location are provided on the support means. A first linkage having a first end pivotally secured to the holder is provided, the second end of the linkage movably engaging a planar surface on the support means. A second linkage disposed at an angle to the first linkage is provided having a first end in engagement with the first linkage and a second end secured by a first leaf spring to the support means and operatively engaging the drive means such that a center portion of the first spring is free to flex in response to the drive means actuating the second linkage. Respective ends of a second leaf spring are secured between the first linkage and the first end of the second linkage such that a center portion of the second spring is disposed midway between the ends of the first linkage, the center portion of the spring being free to flex about an axis substantially parallel to the axis about which the second spring flexes. The center portion of the first spring is positioned from the center portion of the second spring a distance equal to a distance between the center portion of the second spring and ends of the first linkage. Means are further provided for biasing the first linkage toward the planar surface.

Viewed in another aspect, the invention provides in combination a control member mounted by first flexure means for pivoting about a first axis and an elongated actuating member secured between its ends by second flexure means to the control member for pivoting about a second axis parallel to the first axis. An abutment spaced from said axes is provided, one end of said actuating member being in engagement with the abutment and movable therealong in response to pivotal motion of the actuating member on the control member. The actuating member is disposed so as to be pivotal in response to pivotal motion of the control member. Finally, the drive means coupled with the control member for rotating the member in opposed directions are provided whereby structure coupled with the opposite end of the actuating member will be made to traverse a predetermined path defined by the ratio of the distances of respective ends of the actuating member from the second axis.

Preferably, the apparatus includes an elongated arm secured to another flexible leaf spring connected with the support means to prevent the holder from pivoting when the second linkage is being actuated by the drive means and, independently thereof, to pivot the holder into a second position. In the second position the bonding tip is made to apply force to the lead at the bonding site and to bond the lead to the site. The other end of the elongated arm engages a drive cam producing pivotal motion about the center portion of the leaf spring securing the arm to the support means.

This arrangement of the drive mechanism for the bonding tip minimizes inconsistent motion which is encountered in wire bonders constructed according to the prior art. The leaf springs are rigidly secured to the respective members of the drive mechanism or the support means. By virtue of their high moment of inertia about their longitudinal axis, any movements of the mechanism and thereby of the tip in a direction other than that which results from flexing the center portion about a lateral axis of the spring is virtually eliminated. To further increase the rigidity of the drive mechanism, pairs of springs are preferably secured at each joint, which pairs are laterally spaced and mounted in common planes.

In addition to the elimination of inconsistent motion and backlash, the construction of the drive mechanism is substantially simplified. The accurate positioning of pivot points and shafts is no longer necessary. Instead, flextures such as low-cost leaf springs, the position of which can be adjusted when they are being installed, are provided. High-cost precision ball bearings as well as the high cost of manufacturing parts to close tolerances are eliminated. Thus an ultrasonic wire bonder constructed according to this invention cannot only be manufactured at substantially lower costs, but also results in a bonder with improved consistency and virtually exact positioning from bond to bond. In addition, it is no longer necessary to reject to rework a relatively large number of assembled semiconductor devices because leads have been dislodged and welded at the wrong location.

DESCRIPTION OF THE PREFERRED EMBODIMENT

Figure 1:
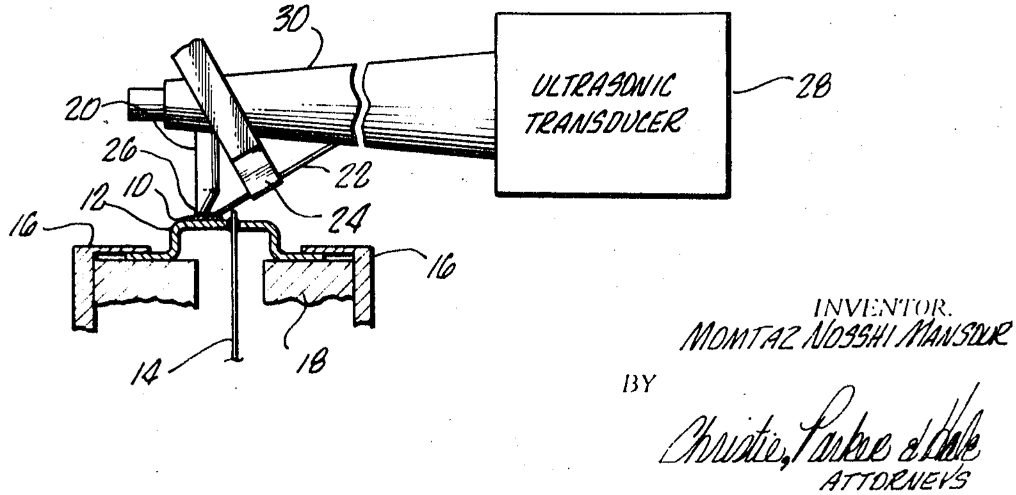
FIG. 1 is a fragmentary sectional view of the weld tip of an ultrasonic transducer in a first welding position.

Initially referring to FIG. 1, there is shown a semiconductor chip or workpiece 10 attached to a header 12 which includes a terminal post 14. The header is clamped in a suitable vise 16 positioned on a mounting post 18 which is conventionally movable in a horizontal plane in a plurality of directions to position the header 12 under a bonding tip 20. A connection wire or lead 22 is fed through a suitable wire clamp 24 to a location intermediate a working surface 26 of the bonding tip 20 and the semiconductor chip 10.

In a typical operation the bonding tip is first positioned above the semiconductor chip 10 at a first selected elevation with the wire 22 disposed between the surface 26 of the bonding tip 20 and the semiconductor chip. The chip 10 is aligned with the tip and the tip is brought down toward the vise and the mounting post until the working surface 26 contacts wire 22 and forces it into contact with the semiconductor chip. The magnitude of the force with which the wire is pressed against the chip is preferably determined by the weight of the tip 20. An ultrasonic transducer 28 attached to tip 20 through horn 30 is energized to vibrate horn 30 and tip 20 at ultrasonic frequencies. The scrubbing action of tip 20 causes the wire and chip to be bonded together. At the completion of the bonding operation the tip 20 is elevated above the chip 10 leaving the wire 22 bonded thereto.

Figure 2:
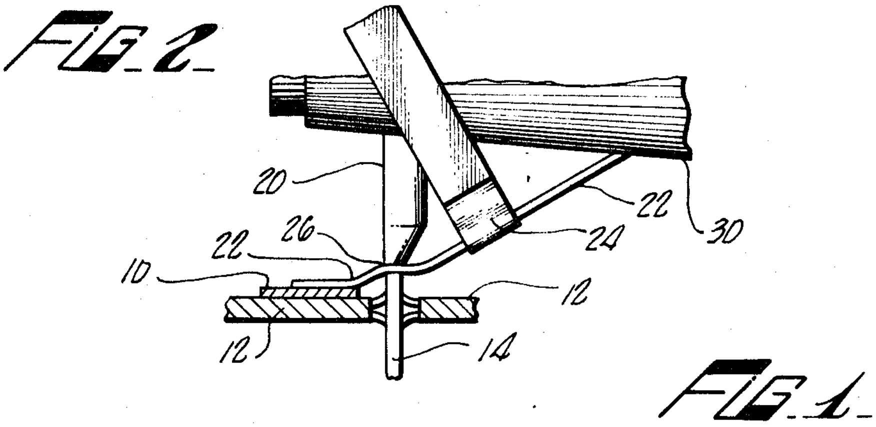
FIG. 2 is an enlarged fragmentary sectional view of the weld tip in a second welding position.

In preparation for a bonding of wire 22 to the terminal post 14, the tip 20 is moved upwardly and positioned at a second elevation above the terminal post. The terminal post is aligned with the tip by suitably moving the mounting post 18. Thereafter the tip is lowered to contact the wire and force it against the upper side of the terminal post as seen in FIG. 2. After the working surface 26 of the tip contacts the wire, the transducer is again energized to bond the wire to the terminal post. Following completion of the second bond the remaining supply of wire is severed from the length of wire connected to the semiconductor chip 10 and terminal post 14 by closing and rotating clamp 24 away from terminal 14. Thereafter, the tip is reset and another extension of wire 22 drawn from the supply preparatory to bonding to another semiconductor chip site and terminal post.

The welding operations just described are performed by an ultrasonic wire bonder 32 (FIGS. 3 and 4) which generally comprises a base 34 which supports a movable mounting post 18 and a support structure or housing 36. The mounting post is movable in a plurality of directions over surface 38, its positioning being determined by a control device such as a chessman manipulator 39.

Figure 4:
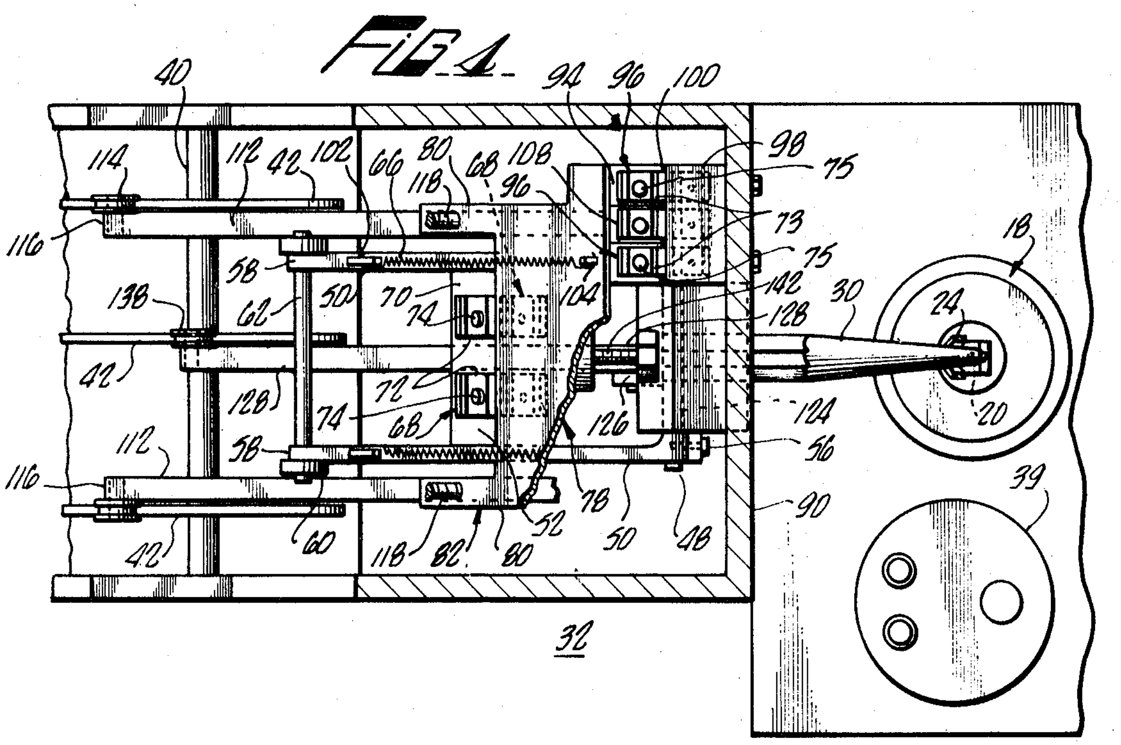
FIG. 4 is a sectional top view taken along lines 4—4 of FIG. 3.
Figure 3:
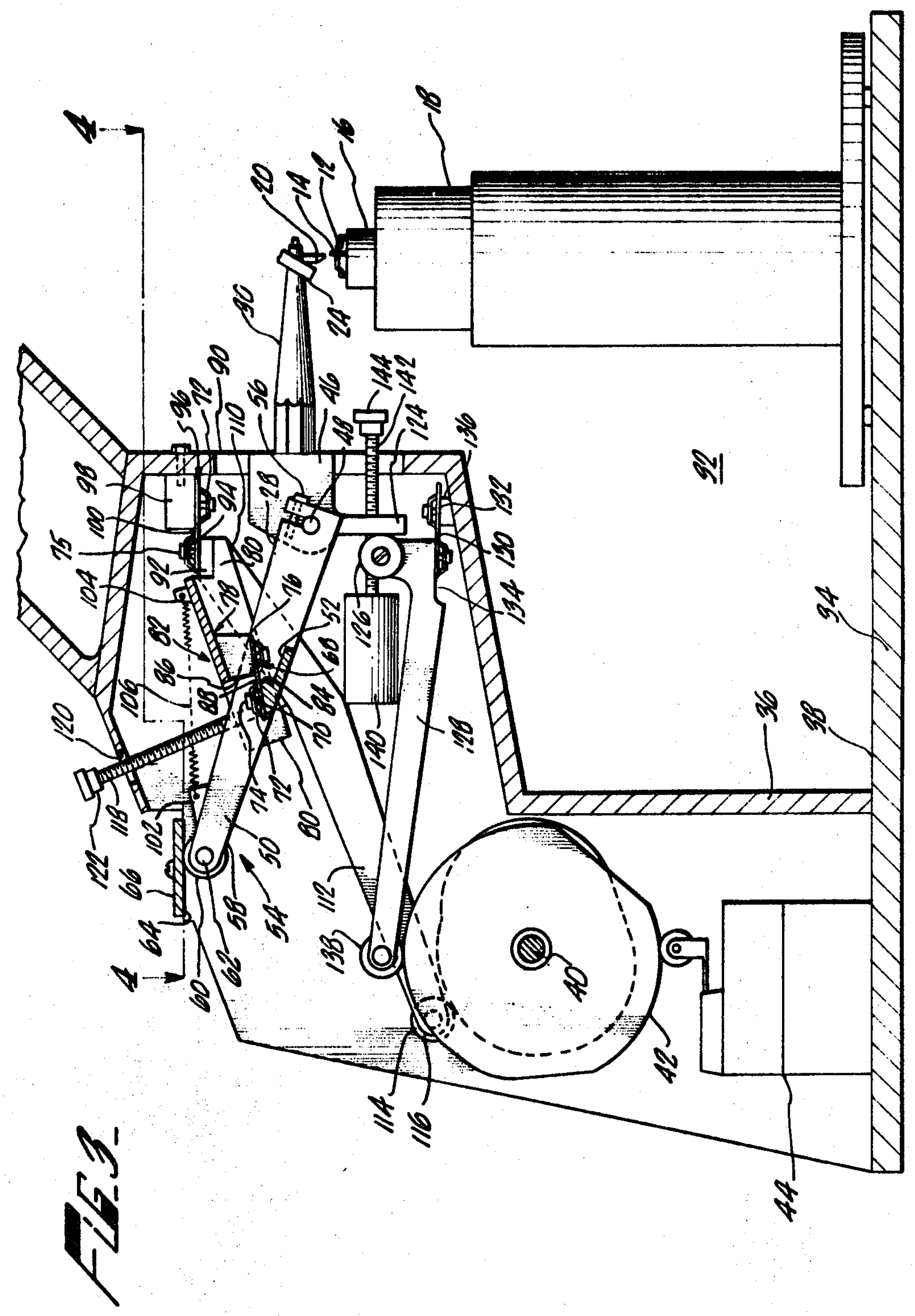
FIG. 3 is a side elevational view, in section, of an ultrasonic wire bonder constructed according to the present invention.

Disposed within the housing 36 substantially parallel to the surface 38 is a shaft 40 which mounts a plurality of longitudinally spaced cams 42 (FIG. 4). A plurality of electric microswitches 44, only one of which is shown in FIG. 3, is secured to the base, each engaging one of the cams 42. The microswitches control the operations of the wire bonder 32 which are performed in conjunction with the operation of the bonding tip 20. Their function is described hereinafter as required to aid in the understanding of this invention.

Referring now to FIG. 3, the tip 20 is shown secured to horn 30 extending outwardly from the housing to a position above vise 16 and mounting post 18. The horn is suitably mounted on a holder 46 disposed interiorly of housing 36. The holder also mounts the ultrasonic transducer 28 shown extending past a rear end of holder 46. A shaft or pivot bearing 48 extends transversely of the longitudinal axis of horn through holder 46 and engages a pair of laterally spaced elongated arms 50 which are integrally constructed with a web 52 to form a first hinge bar 54. Preferably the end of the hinge bar adjacent the holder 46 is split, as shown in FIG. 3, and provided with a suitable setscrew 56 to securely tighten the elongated arms to pivot bearing 48.

Ends 58 of arms 50 are each provided with a roller 60 which are rotatably secured to the arms by means of an axle 62 and which engage a planar surface 64 formed by a crossmember 66 which is suitably secured to housing 36. The crossmember is disposed such that the planar surface 64 is substantially transverse to the vertical motion of tip 20 when the tip moves toward and away from header 12 and mounting post 18.

A pair of leaf springs 68 (see FIG. 4) are secured to an angularly inclined surface 70 on web 52 by means of mounting bars 72 which are tightened against the springs and the web by setscrews 74. Another end of the springs 68 is similarly secured to a flat side 76 of a transverse web 78. Web 78 joins a pair of sidewalls 80 in a spaced-apart relationship to form a second hinge bar 82.

Sides 84 and 86 of webs 52 and 78, respectively, are spaced a short distance apart to define a free center portion 88 of leaf spring 68. The spring can thereby flex about a first pivot axis located intermediate sides 84 and 86 transversely of the spring and parallel to surface 38 of the base 34. Preferably, the mounting bars 72 are arranged such that they engage sides 84 and 86 when the second hinge bar 82 flexes or pivots relative to the first hinge bar 54 about the pivot axis a predetermined amount. The pivotal movement of the hinge bars and springs should not exceed about 25° to prevent the overstressing of the center portion 88 of the leaf spring. Overstressing of the center portion permanently deforms the leaf springs and impairs the proper functioning of the wire bonder 32. The webs 52 and 78 are arranged such that the center portions 88 of the leaf springs 68 are positioned approximately halfway between the axis of transverse shaft 48.

The second hinge bar 82 extends angularly inclined from the first hinge bar 54 toward a front wall 90 of the housing and includes a pair of support blocks 92 adjacent the front wall. The support blocks define upper flat surfaces 94 which receive second leaf springs 96, one end of which is secured thereto by means of a mounting bar 73 and setscrews 75 similar to those described above. The other end of leaf spring 96 is secured to a support bracket 98 extending rearwardly from the front wall 90. Center portions 100 of the leaf springs are then free to flex or pivot about second pivot axis substantially parallel to the first pivot axis. The support bracket 98 and the flat surface 94 of support blocks 92 are arranged such that a distance between the center portion 100 and center portion 88 equals the distance between center portion 88 and the axis of transverse shaft 48 or the axis of shaft 62.

A pair of lugs 104 protrude from the elongated arms 50 and sidewalls 80 of the first and second hinge bars, respectively, and suitably mount a tension spring 106 which biases the first hinge bar in a clockwise rotational direction (as viewed in FIG. 3) and rollers 60 of the first hinge bar into engagement with the planar surface 64. Holder 46 and tip 20 are thereby biased in a direction toward mounting post 18.

Referring now to FIG. 4, a leaf spring 108 is shown secured to support bracket 98 intermediate the pair of second leaf springs 96, one end of the third spring being secured to an end 110 of an elongated actuating member 112 and the other end to bracket 98 by means of mounting bars 72. A second actuating member 112 is provided on the side of horn 30 opposite the first actuating member. The actuating members 112 extend rearwardly and downwardly from support brackets 98 and are provided with suitable rollers 114 secured to the ends 116 opposite support brackets 98. The rollers each engage one of the cams 42 mounted on transverse shaft 40. The actuating members 112 are thereby disposed to pivot about the second pivot axis about which the second hinge bar 82 pivots.

The sidewalls 80 of the second hinge bar 82 extend rearwardly from the transverse web 78 and are provided with threaded holes (not shown) engaging elongated setscrews 118. Referring now to FIG. 3, each setscrew 118 extends upwardly past the housing 36 through a suitable aperture 120. These screws are provided with a knurled knob 122 to permit them to be manually threaded into the threaded holes and into engagement with the elongated actuating members 112.

When the lower ends of the setscrews 118 engage the actuating members 112, the pivotal movement of the second hinge bar 82 about the second pivot axis in a counterclockwise direction (as viewed in FIG. 3) is limited. At the same time, its position relative to the actuating members 112 can be changed, which raises or lowers the position of weld tip 20 relative to the actuating members and the semiconductor device in vise 16. The weld tip can thus be adjusted to be positioned at different elevations to enable its use with semiconductor devices of different sizes and shapes.

When cams 42 are rotated, the actuating members 112 are pivoted about the second pivot axis. This movement is transmitted by the elongated setscrew 118 to the sidewalls 80 of the second hinge bar 82 which is thereby pivoted about the second pivot axis. The pivotal movement of the second hinge bar causes the first hinge bar to pivot about the fist pivot axis and the rollers 60 to move along the planar surface 64. Since the distances between the axis of shafts 48 and 62 and the first pivot axis and the distance between the second pivot axis and the first pivot axis are all equal, the movement of the axis of the shaft 48 is in a vertical line which is transverse to the plane defined by the planar surface 64. Thus for a given pivotal movement of the actuating members 112 induced by cams 42, the axis of shaft 48 moves vertically a corresponding amount. This vertical movement is transmitted from the shaft 48 to the holder 46 and the tip 20. Thus, actuation of the members 112 causes the tip 20 to move in a substantially vertical direction toward and away from the header 12 mounted on vise 16. Any deviations of the movement of the weld tip from a straight line are so minor that they are not noticeable over the relatively short travel of the tip which, as a rule, never exceeds about 30 to about 50 thousandths of an inch.

To prevent the holder, together with the arm 30 and the tip, from pivoting about shaft 48, the holder 46 includes a downwardly extending leg 124 which is engaged by a roller 126.

To raise the tip 20, the tip together with horn 30 and holder 46 is pivoted about shaft 48 in a counterclockwise direction (viewed in FIG. 3). An elongated arm 128 is pivotable about a third pivot axis substantially parallel to the first pivot axis and defined by a center portion 130 of another leaf spring 132 secured similarly to the above-described manner re springs 68 and 96 to one end 134 of the arm and to a mounting block 136 of the housing 36. The elongated arm mounts the roller 126 which thereby not only guides the leg 124 of holder 46 and prevents the holder from pivoting about shaft 48 under its own weight, but can also be utilized to pivot the holder together with horn 30 about shaft 48 to raise or lower tip 20 when called for by the programmed operation of the bonder. An opposite end of the elongated arm 128 suitably mounts a roller 138 engaging another one of the plurality of cams 42.

To assure that the bonding tip exerts a proper force against the wire 22 when it makes the bonds, a counterweight 140 is secured to a threaded shaft 142 extending through a threaded hole (not shown) in leg 124 of holder 46. The threaded shaft is provided with a knurled knob 144 to facilitate its movement in or out of the threaded hole. The counterweight acts as an adjustable balance to vary the magnitude of the force with which the tip engages lead 22 and the semiconductor chip 10 and of the force required to pivot the holder in a counterclockwise direction. Damage to the header 12, the semiconductor chip 10 or the wire 22 to be welded thereto from overtravel of the drive mechanism and the tip 20 is thereby substantially eliminated.

In operation, an item to be worked is placed on header 12 which is in turn secured on vise 16 and the mounting post is positioned relative to the tip to align the tip with the item to be worked. An electric motor (not shown) is energized to rotate the transverse shaft 40 and with it the cams 42. A first of the microswitches 44 is thereafter actuated by one of the cams 42 to energize clamp 24 and advance a length of wire 22 to be bonded to the semiconductor chip 10. Cams 42 in engagement with rollers 116 pivot the actuating members 112 about the second pivot axis in a clockwise direction (FIG. 4) and cause the second hinge bar 82 to pivot about the second pivot axis in a clockwise direction. Tension spring 106 pivots the fist hinge bar 52 clockwisely about the first pivot axis until the first and second hinge bars are constrained from further pivotal movements. Shaft 48 together with the holder 46 and tip 20 thereby move downwardly until the weld tip engages wire 22 of chip 10. Simultaneously therewith, the roller 60 moves along the planar surface 64 in a direction toward the front wall 90. When the working surface 26 of the bonding tip engages the lead and the bonding site on the chip, the pivotal movement of the hinge bars and the actuating members ceases. Any overtravel of the tip does not result in an increase of the pressure it exerts on the wire and the chip since the tip can pivot about shaft 48. While the tip engages the lead and the chip, a second microswitch 44 energizes the ultrasonic transducer 28 to bond the lead 22 to the semiconductor chip 10.

After the bond is made, the cams 42 engaging the actuation members 112 pivot them in a counterclockwise direction (viewed in FIG. 3) until they are in their original position. The pivotal movement is transmitted to the second hinge bar by setscrews 118 which pivots in a counterclockwise direction about the second pivot axis into its original position. Simultaneously, the first hinge bar 52 is pivoted about the first pivot axis into its original position. Shaft 48, the holder 46 and tip 20 thereby move upwardly away from the header 12 into their first selected elevation.

Another of the cams 42 next pivots the elongated arm 128 in a clockwise direction (FIG. 4) about the third pivot axis. The roller 126 thereby pivots leg 124 together with holder 46, arm 30 and tip 20 in a counterclockwise direction about shaft 48. The pivotal movement of the holder and the tip raises the working surface 26 thereof into the second selected elevation about the upper end of, for example, terminal post 14. The terminal post is suitably aligned with the working surface 26 of the tip 20 to position it vertically below the working surface and the lead 22 is positioned intermediate the working surface and one of the terminal posts. Thereafter the actuating members 112 are again biased in a clockwise direction to move the shaft 48 together with tip 20 downwardly until the working surface 26 of the tip engages the wire and the terminal post. The ultrasonic transducer is energized to perform the second bond. The supply of wire is suitably severed from the bonding location such as by closing and rotating the clamp, the tip is retracted and moved back into the first selected elevation and a new welding operation commenced.

If the wire bonder 32 is used with headers having different dimensions, the actuating mechanism can be adjusted to raise or lower the working surface 26 of tip 20 correspondingly. The tip is vertically adjusted by turning the elongated setscrew 118 in one or the other direction to permit the tension spring 106 to pivot the hinge bars in one or the other direction. The working surface 26 of the tip is thereby raised or lowered. After the original position of the tip has been adjusted, operation of the drive mechanism raises and lowers it in the manner described above.

Elimination of rotation between the drive members and their replacement with flexible leaf springs practically eliminates all inconsistent motion which heretofore caused misalignment of the working surface 26 of tip 20 with the header 12. The leaf springs are rigidly secured to the hinge bars and support means. In addition, by laterally spacing each set of leaf springs about which the hinge bars pivot or flex, they are provided with a high moment of inertia relative to an axis transverse to the pivot axes. The high moment of inertia, which is several hundredths of times the magnitude of the moment of inertia of the springs about the pivot axes, substantially eliminates the possibility and danger of unwanted movements of the bonding tip. TIn addition, expensive mounting components, such as high-precision ball bearings and the manufacture of parts of the drive mechanism to extremely close tolerances is eliminated. This elimination of expensive parts and operations substantially reduces the costs of an ultrasonic wire bonder while, at the same time, its accuracy is substantially increased.

I Claim:

1. Ultrasonic welding apparatus comprising:
- support means including means for mounting a part to be welded;
- an ultrasonic transducer connected with a bonding tip disposed adjacent the mounting means;
- drive means for intermittently moving the tip toward and away from the part and for energizing the transducer when the bonding tip contacts the part;
- an elongated first hinge bar having one end pivotally secured to the transducer and another end movably engaging a planar surface of the support means which is disposed substantially transverse to the direction of motion of the bonding tip;
- an elongated second hinge bar in operative engagement with the drive means having one end in engagement with the first hinge bar and another end secured to the support means adjacent the transducer;
- a first leaf spring having respective ends rigidly secured to the first and the second hinge bars such that a center portion of the spring is disposed midway between the ends of the first hinge bar, the center portion of the spring being free to flex about a first axis;
- a second leaf spring having respective ends rigidly secured to the support means and the end of the second hinge bar adjacent the support means such that a center portion of the second spring is free to flex about a second axis substantially parallel to the first axis in response to the drive means actuating the second hinge bar, the center portion of the second spring being positioned from the center portion of the first spring a distance equal to a distance between the center portion of the first spring and an end of the first hinge bar;
- means for biasing the first hinge bar toward the planar surface; and
- guide means for selectively preventing the transducer from pivoting relative to the first hinge bar when the drive means actuate the second hinge bar.

2. Apparatus according to claim 1 wherein the guide means include an elongated arm having one end in engagement with the drive means and a third leaf spring having respective ends secured to the opposite end of the arm and to the support means such that a center portion of the third spring is free to flex about an axis and the guide means pivot the transducer relative to the hinge bar in response to actuation of the arm by the drive means.

3. Apparatus according to claim 2 including adjusting means to alter the position of the bonding tip relative to the mounting means independently of the drive means.

4. Apparatus according to claim 3 including a holding bar adjacent each respective and end of each leaf spring to substantially rigidly secure each such end to the corresponding hinge bar, arm and support means.

5. Apparatus according to claim 4 wherein the holding bars are constructed to constrain the springs from flexing more than approximately 25°.

6. Apparatus according to claim 5 including means for adjusting the force with which the bonding tip contacts the part.

7. Apparatus according to claim 5 wherein the end of the first hinge bar in engagement with the planar surface includes a roller rotatably secured to said end.

8. Apparatus according to claim 5 wherein the drive means include a plurality of axially spaced cams engaging the second hinge bar and the elongated arm of the guide means.

9. Apparatus according to claim 5 wherein the second hinge bar comprises first and second members, the first member being secured to the first and second leaf springs and the second member having one end in engagement with the drive means and another end secured to one end of a fourth leaf spring, the opposite end of which is secured to the support means such that a center portion of the fourth leaf spring is free to flex about the second axis.

10. Apparatus according to claim 9 wherein the adjusting means include a threaded bar in engagement with the first and second members for adjustably spacing the first from the second member and for transmitting actuation of the second member by the drive means to the first member.

11. Apparatus according to claim 10 wherein the first, second and fourth springs each include a plurality of springs, each plurality of springs being spaced apart and coplanar with each other.